United States Patent Office 3,655,644
Patented Apr. 11, 1972

3,655,644
DERIVATIZED STARCH THINNING WITH HYDROGEN PEROXIDE
Harry Walter Durand, Muscatine, Iowa, assignor to Grain Processing Corporation, Muscatine, Iowa
No Drawing. Filed June 3, 1970, Ser. No. 43,211
Int. Cl. C08b 19/01
U.S. Cl. 260—233.3 R                          4 Claims

ABSTRACT OF THE DISCLOSURE

Thinning of derivatized starch is accomplished with the use of hydrogen peroxide under alkaline conditions required for the derivatization.

The temperature at which thinning of derivatized starches is accomplished with the use of hydrogen peroxide is in the range of 80° to 130° F. and at a pH in the range of 7.0 to 12.0. A catalytic material such as copper ion is used in the amount of 5 parts to 100 parts per million based on the weight of starch to assist the thinning action of the hydrogen peroxide.

---

This invention relates to an improved method for producing derivatized starches.

It is well appreciated that for certain applications derivatized starches are preferred over native or unmodified starch. Typical derivatized starches are starch esters as, for example, starch acetate, starch propionate, and starch ethers such as, for example, hydroxyethyl, carboxymethyl and cyanoethyl. In the production of derivatized starches, the derivatization reaction is usually carried out under alkaline conditions and it is customary to thin the starch at some time during the process since derivatized starches are preferred for use in applications where thin boiling starches are required. The thinning of derivatized starches is generally accomplished with the use of a mineral acid such as sulfuric acid or hydrochloric acid. The use of acidic materials generally requires that special acid-resistant equipment be employed in the manufacture of the derivatized starches. This, of course, adds to the cost of the manufacturing process.

A principal object of the present invention is to provide a process for producing derivatized starch of low viscosity without resorting to the use of acidic materials for thinning thereof.

Another object of the invention is to produce derivatized starch without the necessity of using acid-resistant equipment.

Another object of the invention is to produce derivatized starch of improved color.

A still further object of the invention is to provide a process whereby derivatization, thinning and bleaching of starch is conducted in the same equipment under alkaline conditions.

Another object of the invention is to improve product recovery and filterability subsequent to the formation of a starch derivative.

A still further object of the invention is to produce low viscosity derivatized starches without the necessity of thinning the starches by employing dry dextrinization procedures.

The above objects are accomplished in accordance with my discovery by use of hydrogen peroxide in lieu of acidic materials for thinning of derivatized starch. My improved process is exemplified by the following comparison:

Conventional derivatization process

In the conventional process for making hydroxyethyl starch, an aqueous suspension of starch at about 40% starch solids is treated with a mixture of sodium hydroxide and sodium chloride such that the final concentration is 1.5% sodium hydroxide based on the starch and 4% sodium chloride based on the original concentration of water in the slurry. To this is added from 1% to 3% ethylene oxide based on the starch. Then the mixture is heated at 110°–120° F. for from 8 to 24 hours. Sufficient mineral acid, usually sulfuric or hydrochloric acid, is then added to produce a filtrate acidity of 0.1–0.2 normal, and the mixture heated to 120°–130° F. Periodically samples are withdrawn for fluidity determination. At such time as the fluidity is found to have increased to the desired level, the process is stopped simply by adjusting the pH to 5–6 through addition of a suitable alkali, e.g., sodium hydroxide or sodium carbonate, and the product filtered, washed and dried by conventional means. This procedure is also typically applied to the production of other starch derivatives of the ether type such as cyanoethyl, hydroxypropyl, etc.

Although the above typical procedure is fundamental to the production of derivatized starches of this nature it is frequently necessary to use auxiliary oxidizing agents to achieve the desired color and other necessary changes in paste properties. For example, it is conventional in this regard either (1) in the highly alkaline environment of the reaction system, and before or after the derivatization step has been carried out, to introduce up to as much as 3.0% of chlorine (based on the starch solids and in the form of sodium hypochlorite), or (2) under the strongly acidic conditions of the subsequent thinning operation to add a small amount (0.1% or less) of sodium chlorite, allowing enough time in either case for the oxidative process to be completed.

Process of the present invention

A starch slurry at 40% solids is treated with the same levels of sodium hydroxide, salt and ethylene oxide as described above. However, following completion of the hydroxyethylation reaction sufficient copper sulfate is added to give 50 parts/million of copper ion based on the amount of starch present. This is followed by the introduction of sufficient 30–35% aqueous hydrogen peroxide to provide from about 0.1–3.0% of anhydrous hydrogen peroxide based on the starch solids. The mixture is then held for an additional 8–12 hours at the above stated temperature of 110–120° F. followed by a treatment with sufficient sodium bisulfite to remove any residual concentration of hydrogen peroxide. The mixture is then adjusted to pH 6 by addition of a mineral acid such as sulfuric, filtered, washed, and dried in a conventional manner.

The improved process of this invention is further illustrated by the following specific illustrative examples. In these examples "line starch," i.e., the refined starch slurry (~40% solids) resulting from a typical corn wet-milling operation and taken just before the final filtration and drying steps, was employed:

EXAMPLE I

Line starch (4900 grams at 40.8% solids, equivalent to 2000 grams dry starch), under continuous stirring at 110° F., was alkalinized to pH ~11.5 (from an initial value of ~6.0) by slow addition of a mixture of 100 grams of 30% aqueous sodium hydroxide and 448 grams of 26% aqueous sodium chloride (corresponding to 1.5% of anhydrous sodium hydroxide based on the dry starch and 4% of anhydrous sodium chloride based on the water in the starting line starch). Ethylene oxide (50 grams, or 2.5% based on the dry starch) was then introduced and the mixture allowed to react for approximately 16 hours. At the end of this time 50 parts per million (starch basis) of copper ion was added in the form of aqueous copper sulfate, and the mixture (still at pH ~11.5) was split into six equal parts. To these were now added sufficient amounts of 35% aqueous hydrogen peroxide to provide a series of reaction systems containing 0.0, 0.2, 0.4, 0.6, 0.8 and 1.0% levels of anhydrous hydrogen peroxide based on the dry starch solids. After another eight hours stirring, still at 110° F., sufficient sodium bisulfite was added in each case to eliminate any residual hydrogen peroxide followed by adjustment to pH 5.5–6.0 by means of 20% aqueous sulfuric acid. Finally, the various mixtures were vacuum-filtered, the filter cakes washed thoroughly on the filter with distilled water and air-dried at 50°–60° C.

For control purposes, an additional preparation was carried out applying the above same hydroxyethylation procedure to line starch, but conducting the subsequent thinning step (to a final fluidity of 80+ Buel) under acidic rather than peroxidic conditions, in the following manner: On completing the reaction with the ethylene oxide the mixture was taken to a filtrate acidity of 0.216 normal by addition of sulfuric acid and heated at 125°–130° F. for 17 hours. [Shortly after heat-up sodium chlorite (0.05% starch solids basis) was added as a bleaching adjunct.] At the end of this time, the alkali fluidity value obtained was 161 (20 g.), and so the process was terminated by first adding a small amount of sodium bisulfite to get rid of the trace excess of chlorite then adjusting the pH to 5.5 by introduction of 3% aqueous sodium hydroxide. The product was vacuum-filtered, washed and dried in the usual manner.

EXAMPLE II

Line starch (8860 grams at 40.6% solids, equivalent to 3600 grams dry starch), under continuous stirring at 110° F., was alkalinized to pH ~11.5 by addition of an aqueous mixture of sodium hydroxide and sodium chloride in the same proportions as stated in Example I. Copper ion (50 p.p.m., dry starch basis) was now added and the mixture divided into six equal parts. To these were now added various amounts of 30% aqueous hydrogen peroxide such as to give a series of reaction systems containing 0.0, 0.2, 0.4, 0.6, 0.8 and 1.0% levels of anhydrous hydrogen peroxide based on the dry starch solids. After seven hours of stirring at 110° F., excess hydrogen peroxide was eliminated in each case by addition of sufficient sodium bisulfite, and each system divided into two equal parts, thus providing two sets of identically hydrogen peroxide-thinned starches. One set was simply adjusted to pH 5.5–6.0 by addition of 20% aqueous sulfuric acid, and finally worked up to finished underivatized control products by means of the filtering, washing and drying procedure as set forth in Example I. To each member of the remaining set (still at pH ~11) was now added acrylonitrile (2.5%, based on the starch solids) and the various mixtures reacted for approximately 16 hours, still at 110° F. At the end of this time, the pH in each case was adjusted to 5.5–6.0, and the various resulting products worked up by the aforesaid filtration/washing/drying procedure.

EXAMPLE III

Three batches of line starch (each equivalent to 2000 grams dry starch at circa 40% solids) under constant stirring at 110° F. were alkalinized to pH ~11.5 by slow addition of an aqueous mixture of sodium hydroxide and sodium chloride of the same proportions as cited in Example I. Ethylene oxide (3.0%, based on the dry starch) was then introduced in each case and the mixtures allowed to react for circa 16 hours. At the end of this time 50 parts per million (starch basis) of copper ion were added in the form of aqueous copper sulfate and each mixture now split into two equal parts giving a total of six mixtures of hydroxyethylated starch (still at pH ~11.5). To these were now added sufficient amounts of 30% aqueous hydrogen peroxide to provide a series of reaction systems containing 1.0, 1.4, 1.7, 2.0, 2.5 and 3.0% of anhydrous peroxide based on the dry starch solids. After another eight hours stirring at 110° F., sufficient sodium bisulfite was now added in each case to eliminate excess hydrogen peroxide and the mixtures adjusted to pH 5.5 by addition of 20% aqueous sulfuric acid. Finally the various mixtures were vacuum-filtered, the filter cakes washed thoroughly with distilled water and air-dried at 50°–60° C.

EXAMPLE IV

Theree batches of line starch (each equivalent to 1000 grams dry starch at 40.8% solids) under constant stirring at 100° F. were alkalinized to pH ~11.3 by slowly introducing a mixture of 30% aqueous sodium hydroxide and 26% aqueous sodium chloride so constituted as to provide 0.75% of anhydrous sodium hydroxide based on the dry starch and 2.0% of anhydrous sodium chloride based on the water in the starting line starch. Copper ion (50 parts per million, dry starch basis), in the form of aqueous copper sulfate, was added to each followed by such amounts of 30% aqueous hydrogen peroxide as to give a series of three reaction systems containing 0.3, 0.6 and 1.0% levels of anhydrous hydrogen peroxide based on the dry starch. After 16 hours of stirring at 110° F., the trace excess of hydrogen peroxide was removed in each case by addition of sodium bisulfite and each system divided into two equal parts, thus providing two sets of identically hydrogen peroxide-thinned starches (at pH 10.8, 10.4 and 10.0, in the order of increasing peroxide pretreatment level). One set was simply adjusted to pH 5.5–6.0 by adding 20% aqueous sulfuric acid, and finally worked up to underivatized control products by means of the filtering, washing and drying procedure as set forth in Example I. Each member of the remaining set, again under constant stirring at 110° F., was now subjected to acetylation by dropwise addition of 25 grams (5.0%, based on the dry starch) of acetic anhydride. The abrupt decrease in alkalinity resulting from this operation in each case was counteracted by simultaneously adding 3.0% aqueous sodium hydroxide at such rate as to permit the pH during the reaction to be maintained largely within the range of 8.0–8.5. After all of the anhydride had been introduced, each mixture was stirred for another 5–10 minutes and then adjusted to pH 5.5–6.0 by means of 20% aqueous sulfuric acid before working up in the prescribed manner. An unthinned control product was also made applying the same procedure of acetylation to the above same starting line starch prealkalinized to pH 8.5 by addition of 3.0% aqueous sodium hydroxide.

The properties of the products obtained in the above examples are set forth in Table I (Example I), Table II (Example II), Table III (Example III) and Table IV (Example IV). Table III also lists findings for two commercial hydroxyethyl starches of 80+ Buel, presumably made using thinning procedures based on some form of acid-catalyzed degradation.

TABLE I

Properties of hydroxyethyl starches (applied ethylene oxide level ~2.5%) as affected by post-reaction with various levels of hydrogen peroxide ($Cu^{++}$-catalyzed)

| Assay | | 0.0 (Unthinned) | H$_2$O$_2$ level (percent as anyhdrous, starch basis) | | | | 0.0 (acid-thinned to 80+ Buel) |
|---|---|---|---|---|---|---|---|
| | | | 0.2 | 0.4 | 0.6 | 0.8 | 1.0 | |
| 1 | Moisture, percent | 8.6 | 6.8 | 7.8 | 6.3 | 7.5 | 10.3 | 8.6 |
| 2 | Ash, percent | 0.09 | 0.11 | 0.30 | 0.16 | 0.18 | 0.19 | 0.19 |
| 3 | Alkali fluidity (x g.) | 38 (10 g.) | 92 (20 g.) | 142 (20 g.) | 152 (20 g.) | 158 (20 g.) | 168 (20 g.) | 166 (20 g.) |
| | | | | | | | 122 (40 g.) | 122 (40 g.) |
| 4 | a. Buel rating | (²) | 20 | 55-60 | 65-70 | 70-75 | 80+ | 80+ |
| | | | ~0 | 0.06 | 0.05 | 0.08 | 0.09 | (³) |
| 5 | Carboxyl percent [corrected]² | 0.10 | 10.0 | 15 | 20 | 20 | 25 | 25 |
| 6 | Brabender findings at percent solids indicated (pH preadjusted to 6.5). | 8.0 | | | | | | |
| | a. pH before adjustment | 6.85 | 7.3 | 6.8 | 7.3 | 7.1 | 7.2 | 6.9 |
| | b. Gelatinization temp. (°C.) | 62 | 61 | 61 | 58 | 58 | 58 | 58 |
| | c. Peak consistency (B.U.)⁴ at T.°C | ~1,000 (71) | 510 (68.5) | 600 (69.5) | 1,130 (68) | 635 (67) | 820 (66.5) | >1,000 |
| | d. B.U. at 95°C.: | | | | | | | |
| | Initial | 580 | 60 | 40 | 50 | 30 | 35 | 40 |
| | After 30 minutes | 370 | 35 | 20 | 40 | 25 | 30 | 35 |
| | e. B.U. at 50°C.: | | | | | | | |
| | Initial | 870 | 200 | 205 | 320 | 220 | 215 | 300 |
| | After 30 minutes | 725 | 185 | 205 | 335 | 230 | 230 | 310 |
| | Setback at 50°C. (ΔB.U., 30 min.) | −145 | −15 | ~0 | +15 | +10 | +15 | +10 |

¹ Thick boil.
² Carboxyl content determined by titration with 0.1 N NaOH and corrected by subtracting the value for a line starch control.
³ Negligible.
⁴ Brabender Units.

TABLE II

PROPERTIES OBTAINED BY CYANOETHYLATION¹ OF LINE STARCH PRE-THINNED BY REACTION WITH VARIOUS LEVELS OF HYDROGEN PEROXIDE

| Assay | | 0.0 | | 0.2 | | 0.4 | | 0.6 | | 0.8 | | 1.0 | |
|---|---|---|---|---|---|---|---|---|---|---|---|---|---|
| | | Unthinned line starch | | | | | | Unthinned line starch | | | | | |
| | | No CE | CE | No CE | CE | No CE | CE | No CE | CE | No CE | CE | No CE | CE |
| 1 | Moisture content, percent | 6.3 | 3.3 | 8.3 | 9.9 | 6.6 | 9.8 | 11.1 | 5.5 | 10.9 | 4.7 | 4.4 | 3.8 |
| 2 | Ash content, percent | 0.06 | 0.05 | 0.01 | 0.09 | 0.07 | 0.11 | 0.07 | 0.14 | 0.22 | 0.14 | 0.21 | 0.12 |
| 3 | Alkali fluidity (20 g.) | 59 (10 g.) | 22 (10 g.) | 86 | 78 | 143 | 137 | 152 | 161 | 158 | 156 | 163 | 165 |
| | a. Buel rating | (²) | (³) | 20 | 15 | 60 | 65 | 65-70 | 65 | 70-75 | 70 | ~80 | ~80 |
| 4 | Carboxyl content, percent | 0.10 | 0.11 | 0.14 | 0.16 | 0.16 | 0.21 | 0.175 | 0.21 | 0.19 | 0.19 | 0.21 | 0.23 |
| 5 | Cyanoethyl content, percent | | 1.79 | | 1.80 | | 1.71 | | 1.76 | | 1.73 | | 1.67 |
| | a. Degree of substitution | | 0.055 | | 0.055 | | 0.052 | | 0.054 | | 0.053 | | 0.051 |
| | b. Cyanoethylation Eff. percent | | ~72 | | ~72 | | ~68 | | ~71 | | ~70 | | ~67 |
| 6 | Brabender findings at percent solids indicated (pH adjusted to 6.5) | | | | | | | | | | | | |
| | a. pH before adjustment | 8.0 | 8.0 | 10.0 | 7.1 | 15.0 | 15.0 | 20.0 | 20.0 | 20.0 | 20.0 | 20.0 | 20.0 |
| | b. Gelat. temp. (°C.) | 6.0 | 6.9 | 6.9 | ~61 | 7.1 | 7.1 | 7.4 | 7.4 | 6.4 | 7.1 | 6.9 | 6.9 |
| | c. Peak consist. (B.U.) at T°C | ~70 | ~63 | ~68 | (68.5) | ~67 | 60 | ~67 | ~59 | ~66 | ~58 | ~70 | ~60 |
| | | 760(92) | 1,510(84) | 660(77) | 1,435(68.5) | 990(75) | 740(69) | 1,355(75) | 1,050(66) | 1,050(75) | 2,720(66) | 320(84.5) | 590(72) 1,550(67) |
| | d. B.U.⁴ at 95°C.: | | | | | | | | | | | | |
| | Initial | 740 | 1,430 | 240 | 285 | 220 | 290 | 310 | 1,060 | 300 | 780 | 70 | 50 90 |
| | After 30 min | 610 | 1,375 | 100 | 230 | 80 | 280 | 300 | 810 | 220 | 550 | 45 | 30 60 |
| | B.U. at 50°C.: | | | | | | | | | | | | |
| | Initial | 1,420 | 1,680 | 440 | ~1,500 | ~1,200 | 840 | >3,000 | 2,470 | >3,000 | 1,330 | 1,900 | 220 375 |
| | After 30 min | 1,420 | 1,660 | 1,130 | ~1,625 | ~2,200 | 830 | (⁵) | 2,220 | (⁵) | 1,080 | 3,440 | 220 300 |
| | Setback at 50°C. (ΔB.U., 30 min.) | ~0 | −20 | +690 | +25 | +1,000 | −10 | (⁵) | −250 | (⁵) | −250 | +1,540 | ~0 +15 |
| 7 | Cold (24-hr) paste properties: | | | | | | | | | | | | |
| | a. Wet residue (g.), from 200 g. at 1.0% solids | 13 | 16 | 26 | 0.8 | 14 | 31 | 15 | 0.9 | 19.5 | 0.7 | 11.5 | 0.9 1.4 |
| | b. Redispersibility percent at 1% solids | 63 | 26 | 33 | ~100 | 35 | ~100 | 35 | ~100 | 20 | ~100 | 57 | ~100 ~100 |
| | c. Clarity percent at 0.5% solids | 12 | 18.5 | 17.5 | 42 | 13 | 59 | 12 | 54 | 5 | 52.5 | 9 | 46.5 14.5 |

¹ Acrylonitrile addition level = 2.5%, by weight of the starch solids.
² Thick boiling.
³ Very thick boiling.
⁴ Brabender Units.
⁵ Too high for det'n.

TABLE III.—PROPERTIES OF SOME 80+ BUEL HYDROXYETHYL STARCH PREPARATIONS

| Assay | Commercial products [1] | | Peroxide thinned preparations [2] $H_2O_2$ level (percent, as anhydrous, based on the starch solids) | | | | | |
|---|---|---|---|---|---|---|---|---|
| | A | B | 1.0 | 1.4 | 1.7 | 2.0 | 2.5 | 3.0 |
| 1. Moisture content (percent) | 10.3 | 9.5 | 10.9 | 10.9 | 10.5 | 10.3 | 5.8 | 6.9 |
| 2. Ash (percent) | 1.55 | 0.50 | 0.23 | 0.14 | 0.15 | 0.23 | 0.27 | 0.28 |
| 3. Alkali fluidity (40 g.) | 159 | 150 | 124 | 135 | 141 | 149 | 152 | 152 |
| 4. Carboxyl (percent) | ([3]) | ([3]) | 0.11 | 0.135 | 0.15 | 0.175 | 0.19 | 0.19 |
| 5. Brabender values at 35% solids (except where indicated): | | | | | | | | |
| a. Unadjusted pH | 7.4 | 5.8 | [4] 7.15 | 6.8 | 7.4 | 7.4 | 7.0 | 6.9 |
| b. Gelatinization temp. (° C.) | 60 | 62 | [4] 57 | 55 | 53 | 53 | 55 | 53 |
| c. Peak consistency (B.U.) at T., ° C | 820 (71) | 680 (71) | [4]950 (64.5) | 2,280 (64.5) | 1,870 (65.5) | | 1,250 (68) | 1,190 (67) |
| d. B.U. at 95° C.: | | | | | | | | |
| Initial | 85 | 85 | [4] 30 | 80 | 80 | 70 | 60 | 50 |
| After 30 min | 40 | 40 | [4] 25 | 65 | 60 | 55 | 50 | 50 |
| e. B.U. on cooling to 50° C | 260 | 390 | [4] 220 | 580 | 465 | 465 | 435 | 400 |
| B.U. on cooling to 50° C. after 30 min | 280 | 470 | [4] 225 | 620 | 485 | 490 | 440 | 405 |
| Setback at 50° C. (ΔB.U., 30 minutes) | +20 | +80 | [4] +5 | +40 | +20 | +25 | +5 | +5 |
| 6. Brookfield viscosity (cp.) at 25% solids: | | | | | | | | |
| a. Initial, at 50° C | 334 | 294 | 563 | 438 | 345 | 270 | 252 | 190 |
| b. After ca. 20 hrs. at ca. 80° F | 1,490 | 1,770 | 2,430 | 1,800 | 1,170 | 790 | 670 | 520 |

[1] Applied ethylene oxide level unknown; thinning probably acid catalyzed, via dextrinization or semi dry procedure.
[2] For peroxide thinned preparations, applied EO level=3.0%.
[3] Negligible.
[4] 25% solids.

TABLE IV.—PROPERTIES OBTAINED BY ACETYLATION [1] OF LINE STARCH PRE-THINNED BY ACTION OF VARIOUS LEVELS OF HYDROGEN PEROXIDE

| Assay | 0.0% | | 0.3% | | 0.06% | | 1.0% | |
|---|---|---|---|---|---|---|---|---|
| | Unthinned line starch | | | | | | | |
| | No Ac | Ac | No Ac | Ac | No Ac | Ac | No Ac | Ac |
| 1. Moisture content (percent) | 5.9 | 6.9 | 8.1 | 8.2 | 8.4 | 8.1 | 7.5 | 9.3 |
| 2. Ash (percent) | 0.02 | 0.04 | 0.04 | 0.05 | 0.10 | 0.06 | 0.35 | 0.12 |
| 3. Alkali fluidity (x g.) | 69 (10) | 76 (10) | 129 (20) | 136 (20) | 156 (20) | 159 (20) | 132 (40) | 134 (40) |
| a. Buel rating | ([2]) | ([2]) | 45 | 50 | 70 | 75 | >80 | >80 |
| 4. Acetyl content (percent) | | 0.86 | | 0.825 | | 0.75 | | 0.89 |
| a. D.S. | | 0.033 | | 0.031 | | 0.029 | | 0.034 |
| b. Acetylation efficiency (percent) | | ~42 | | ~36 | | ~37 | | ~43 |
| 5. Brabender findings at percent solids indicated (pH=6.5) | 8.0 | 8.0 | 15 | 15 | 15 | 15 | 20 | 20 |
| a. pH before adjustment | 5.8 | 5.5 | 6.9 | 6.5 | 7.0 | 6.6 | 6.8 | 6.5 |
| b. Gelatinization temp. (° C.) | 70 | 66.5 | 68 | 66 | 70 | 65 | 71 | 65 |
| c. Peak consist. (B.U.) at T.° C | 790 (90) | 770 (88) | 1,000 (80) | 535 (79) | 265 (83) | 170 (76) | 275 (84) | 180 (77) |
| d. B.U. at 95° C.: | | | | | | | | |
| Initial | 750 | 720 | 160 | 80 | 30 | 15 | 40 | 20 |
| After 30 min | 590 | 520 | 120 | 55 | 20 | 10 | 40 | 15 |
| e. B.U. at 50° C.: | | | | | | | | |
| Initial | 1,480 | 1,130 | ~2,200 | 270 | ~1,000 | 80 | ~1,780 | 120 |
| After 30 min | 1,480 | 1,040 | ~3,500 | 340 | ~1,840 | 120 | ~2,760 | 180 |
| Setback at 50° C. (ΔB.U., 30 min.) | ~0 | −90 | +1,300 | +70 | +840 | +40 | +980 | +60 |
| 6. Cold (24-hour) paste properties: | | | | | | | | |
| a. Wet residue (g.), from 200 g. at 1.0% solids | 9.5 | 2.8 | 15 | 8.3 | 14 | 3.3 | 12 | 4.1 |
| b. Redispersibility (percent), at 1.0% solids | ~82 | ~100 | ~38 | ~72 | ~47 | ~87 | ~49 | ~85 |

[1] Acetylation accomplished by reaction with 5.0% of acetic anhydride, based on the weight of the dry starch.
[2] Thick boiling.

A brief explanation of terms employed in the above tables is as follows:

(A) Alkali fluidity and Buel rating

The fluidity (flowability) of a starch paste of given concentration is in effect the reciprocal of the viscosity, and is broadly measurable as the volume (milliliters) delivered by gravity through a funnel orifice in a given amount of time. Because of its much greater solvent power for starch, as well as its inhibition of retrogradative change, aqueous sodium hydroxide is used to make the paste rather than water. To enable the measurement to distinguish reproducibly between different fluidity grades of starch, the conditions must be carefully standardized and controlled with regard to temperature, alkali concentration, paste preparative procedure, funnel dimensions, etc.

The familiar acid-modified starches of industry have long been rated according to their Buel alkali fluidity, as defined by the method and scale originally introduced for this purpose (Buel, H., Intern. Congr. Applied Chem., 9th Congr. Washington and New York, Original Communications, 13, 63 (1912)); Kerr, R. W., "Chemistry and Industry of Starch," Academic Press, New York, 133 (1950). The alkali fluidity values of Tables I, II, III and IV were determined by a modification of the Buel procedure [Fetzer, W. R., and Kirst, L. C., Cereal Chem., 36, 108 (1959)] and subsequently translated to the Buel scale. The data are expressed as volume (milliliters) of paste at 75° F. delivered in 60 seconds from a specially designed (so-called Clinton) funnel. The starch weight used in each case is shown in parentheses (10-, 20-, or 40-gram amount corrected to 10% moisture content) as dispersed in ~334 milliliters of 1.8% aqueous sodium hydroxide.

(B) Brabender findings

The instrument used for the evaluation included under this heading was the Brabender VISCO-amyl-GRAPH. This is a continuously recording device used to measure and record the resistance to shear of a starch aqueous slurry through a course of heating and subsequent cooling under relatively uniform conditions. That is to say, for the purposes of arriving at the data shown in Tables I, II, III and IV, the temperature of each slurry was gradually raised at a constant rate (1.5° C./minute) until reaching 95° C., where it was maintained for 30 minutes, then allowed to drop at the same constant rate to 50° C. where it was finally maintained for the last 30 minutes.

The temperature at which a measurable "consistency" reading in Brabender Units (B.U.) is first observed is referred to as the gelatinization temperature. This temperature approximates that at which the starch granules first begin to swell and lose their property of birefringence under polarized light. As a general rule, the lower the gelatinization temperature the greater the water imbibition and hydrocolloidal activity of the starch being tested.

As the temperature of the mixture continues to rise above the gelatinization temperature, the consistency also rises until it reaches a peak value and then usually drops off. This thickening process is referred to as pasting and is largely the effect of the granule swellage, whereas the subsequent thinning comes about through the ultimate process of granule bursting and dispersion. A sharper peak-point and lower temperature at which the peaking occurs reflect improvements in water imbibility and hydrocolloidal activity.

Most underivatized starches, whether or not degraded by simple physical means such as partial acid hydrolysis, tend to undergo a process called retrogradation. Although not easily defined in fundamental terms, this process amounts, practically, to a major loss of valuable hydrocolloidal activity, as manifested for example by the abnormal increase in consistency that occurs on cooling a starch paste below about 50°–60° C. The term "setback" as applied to the Brabender-prepared pastes covered in the tables refers to the magnitude of this increase in consistency observed on holding the pastes for 30 minutes at 50° C.

(C) Cold (24-hour) paste properties (Table I)

Starch retrogradation (q.v.), apart from resulting in abnormally increased paste consistency at temperatures below about 50°–60° C., is also manifested by reversion to a lower order of dispersibility, perhaps best seen on high dilution of a cold starch paste in (1) the amount of undispersed material remaining (e.g., the wet residue obtained on centrifuging 200 grams of a 1.0%-diluted, Brabender-prepared, one-day-old cold paste), (2) the degree of redispersibility (as gauged by the percent of solubles in the supernatant of the same diluted centrifugate), and (3) the clarity (or relative lack of clarity) rating of the same paste on dilution to 0.5% solids.

On the basis of the above terminology, the data of Table I point up the strong thinning action of hydrogen peroxide and the fact that the resulting derivatives maintain their excellence in pasting properties and relative freedom from paste setback and retrogradative change throughout the range of fluidity increase covered. That the mode of degradation in the thinning process is hydrolytic rather than oxidative is indicated by the only slight increase of carboxyl content obtained and by the fact (determined in a separate experiment) that similar treatment with as much as 1.0% of chlorine (well recognized as a means of oxidatively modifying starch and derivatives thereof) gives a product of only 5–10 Buel fluidity, considerably less than the value gained using hydrogen peroxide at the 0.2% level. It was noted that in the case of all of the peroxide-thinned derivatives represented, including that at the 80+ Buel fluidity, the filtration and washing operations proceeded at a reasonably rapid rate, and none of the filtrate liquors showed cloudiness indicative of product loss through solubilization. On the other hand, the acid-thinned derivative filtered extremely slowly, tended to slime over on subsequent washing and gave a very hazy filtrate.

The data of Table II also point up the thinning action of hydrogen peroxide, although in this case much of the value of the procedure is cancelled by the strong bodying effect of the subsequent cyanoethylation. What is most significant from the data in this table, however, is the sharp contrast between the derivatized and underivatized thinning products in terms of the superior pasting characteristics and non-retrogradative nature of the former.

The data of Table III illustrate the ability of hydrogen peroxide, when used as a post-thinning agent in amounts greater than 1.0%, to produce starch derivatives (here exemplified by the hydroxyethyl ether) of very high fluidity, in excess of 80+ Buel. All of the preparations were readily filtered, and their filter cakes easily washed with fresh water with no sign of colloidal loss into the filtrate.

The data of Table IV illustrate the application or hydrogen peroxide thinning procedure to the preparation of high fluidity starch esters, in this instance exemplified by an acetate produced by reaction with acetic anhydride. The contrast between the derivatized and underivatized thinned products in terms of the superior pasting characteristics and reduced retrogradative tendencies of the former is apparent.

In general, the amount of hydrogen peroxide (anhydrous basis) to be used according to this invention ranges from about 0.1 to 3.0% by weight of starch. The temperature at which thinning of derivatized starches is accomplished with use of hydrogen peroxide is not critical and this desideratum can be accomplished at temperatures usually employed for the starch derivatization reaction, which temperatures are generally in the range of 80° to 130° F. and at a pH in the range of 7.0 to 12.0. Basically, hydrogen peroxide can be used to accomplish thinning of derivatized starch products under conditions normally employed for producing derivatized starch products, such conditions being well known to those skilled in the art. When producing starch ethers the hydrogen peroxide can be utilized prior to or subsequent to addition of the starch etherifying agent, whereas in the case of starch esters the hydrogen peroxide is utilized prior to addition of the starch esterifying agent.

The starch material which can be employed in accordance with this invention can be any common cereal starch such as corn, rice or wheat starches and root or root-type starches such as potato, waxy maize, waxy sorghum, cassava and the like. The starch raw material need not be highly refined and thus it may contain small proportions of non-starch material such as protein, fat and fiber.

It is preferred, but optional, to employ a catalytic material such as copper ion (added in the form of a copper salt) to assist the thinning action of the hydrogen peroxide. The amount of copper ion employed would range from about 5 parts per million to 100 parts per million based on the starch solids. Also, residual hydrogen peroxide remaining with the derivatized starch can be removed by addition of reducing agents such as sodium bisulfite or sodium hydrosulfite, for example.

All percentages set forth herein are by weight unless otherwise specified.

Those modifications and equivalents which fall within the spirit of the invention are to be considered a part thereof.

What is claimed is:

1. A process for producing a starch ester which comprises treating an aqueous slurry of starch at a temperature in the range of about 80 to 130° F. and at a pH in the range of about 7 to 12 with hydrogen peroxide in an amount from about 0.1 to 3% by weight of starch and a copper ion in an amount from about 5 parts to 100 parts by weight of starch, then adding a reducing agent to remove residual hydrogen peroxide, thereafter while maintaining said conditions adding a starch acylating agent and maintaining said reaction mixture under said conditions for a period sufficient to obtain a thinned starch ester and recovering a thinned starch ester product.

2. A process for producing a starch ether which comprises treating an aqueous slurry of starch at a temperature in the range of about 80 to 130° F. and at a pH in the range of about 7 to 12 with hydrogen peroxide in an amount from about 0.1 to 3% by weight of starch and a copper ion in an amount from about 5 parts to 100 parts per million parts by weight of starch, then adding a reducing agent to remove residual hydrogen peroxide, thereafter while maintaining said conditions adding a starch cyanoalkylating agent and maintaining said reaction mixture under said conditions for a period sufficient to obtain a thinned starch ether and recovering a thinned starch ether product.

3. A process for producing a starch ether which comprises treating an aqueous slurry of starch at a temperature in the range of about 80 to 130° F. and at a pH in the range of about 7 to 12 with hydrogen peroxide in an amount from about 0.1 to 3% by weight of starch and a copper ion in an amount from about 5 parts to 100 parts per million parts by weight of starch, then adding a reducing agent to remove residual hydrogen peroxide, thereafter while maintaining said conditions adding a starch etherifying agent selected from the group consisting of hydroxyalkylating and carboxyalkylating agents and maintaining said reaction mixture under said conditions for a period sufficient to obtain a thinned starch ether, and recovering a thinned starch ether product.

4. A process for producing a starch ether which comprises treating an aqueous slurry of starch at a temperature in the range of about 80 to 130° F. and at a pH in the range of about 7 to 12 with an etherifying agent selected from the group consisting of hydroxyalkylating and carboxyalkylating agents, then while maintaining said reaction mixture under said conditions adding hydrogen peroxide in an amount from about 0.1 to 3% by weight of starch and a copper ion in an amount from about 5 to 100 parts per million parts by weight of starch, thereafter adding a reducing agent to remove residual hydrogen peroxide, and recovering a thinned starch ether product.

References Cited

UNITED STATES PATENTS

| | | | |
|---|---|---|---|
| 2,307,684 | 1/1943 | Kauffmann et al. | 127—33 |
| 2,999,090 | 9/1961 | Hobbs | 260—233.3 |
| 3,264,283 | 8/1966 | Jarowenko | 260—233.3 |

OTHER REFERENCES

Remy, Treatise On Inorganic Chemistry, Cover page and pages 718 and 719, 1956.

Moeller, Inorganic Chemistry, Cover page and pages 505 & 506, (1957).

DONALD E. CZAJA, Primary Examiner

M. I. MARQUIS, Assistant Examiner

U.S. Cl. X.R.

106—130, 211; 260—233.3 A, 233.5

UNITED STATES PATENT OFFICE
CERTIFICATE OF CORRECTION

Patent No. 3,655,644　　　　　　　　　Dated April 11, 1972

Inventor(s) Harry Walter Durand

It is certified that error appears in the above-identified patent and that said Letters Patent are hereby corrected as shown below:

Column 4, line 32, "100° F." should be -- 110° F. --

Columns 7 and 8, in footnote 1 for Table III, before "Applied" insert -- Commercial Products: --

Columns 7 and 8, for Assay 5 c. in Table III, under the column headed "B", "680(71)" should be -- 680(72) --

Columns 7 and 8, in Table IV, the column headed "0.06%" should be headed -- 0.6% --

Columns 7 and 8, for Assay 4 b. in Table IV, under the heading "0.3% Ac", " 36" should be --　 39 --

Column 8, line 56, "amyl" should be -- amylo --

Column 10, line 1, "or" should be -- of --

Column 10, line 55, after "parts" insert -- per million parts --

Signed and sealed this 26th day of September 1972.

(SEAL)
Attest:

EDWARD M. FLETCHER, JR.　　　　　　　　　ROBERT GOTTSCHALK
Attesting Officer　　　　　　　　　　　　Commissioner of Patents